(12) United States Patent
Maletych

(10) Patent No.: US 10,498,828 B2
(45) Date of Patent: Dec. 3, 2019

(54) SYSTEMS AND METHODS OF ACCESSING AND DECODING VEHICLE MANUFACTURE INFORMATION

(71) Applicant: Kurt Maletych, Carlsbad, CA (US)

(72) Inventor: Kurt Maletych, Carlsbad, CA (US)

(*) Notice: Subject to any disclaimer, the term of this patent is extended or adjusted under 35 U.S.C. 154(b) by 0 days.

(21) Appl. No.: 16/110,424

(22) Filed: Aug. 23, 2018

(65) Prior Publication Data

US 2019/0068713 A1 Feb. 28, 2019

Related U.S. Application Data

(60) Provisional application No. 62/549,370, filed on Aug. 23, 2017.

(51) Int. Cl.
| | |
|---|---|
| *H04L 29/08* | (2006.01) |
| *G06F 16/951* | (2019.01) |
| *G06F 3/14* | (2006.01) |
| *G06Q 30/02* | (2012.01) |

(52) U.S. Cl.
CPC ............ *H04L 67/12* (2013.01); *G06F 16/951* (2019.01); *G06F 3/14* (2013.01)

(58) Field of Classification Search
None
See application file for complete search history.

(56) References Cited

U.S. PATENT DOCUMENTS

2003/0036964 A1* 2/2003 Boyden ............ G06Q 30/0609
705/26.3

2005/0086070 A1* 4/2005 Engelman ............ G06Q 10/087
705/28
2008/0052216 A1* 2/2008 Johnson ................ G06Q 40/04
705/37

(Continued)

FOREIGN PATENT DOCUMENTS

RU 2516694 C2 5/2014
WO WO-2016/172785 A1 11/2016

OTHER PUBLICATIONS

"Check Your VIN Instantly." *Vehicle Identification No.—Vin Numbers*. (2019) Web. Accessed Jan. 10, 2019. 7 pages. https://vehicleidentificationnumber.com/.

(Continued)

*Primary Examiner* — Shirley X Zhang
(74) *Attorney, Agent, or Firm* — Mintz Levin Cohn Ferris Glovsky and Popeo, P.C.

(57) ABSTRACT

Systems, methods, and techniques to access and decode vehicle information are provided. The method includes generating a request for a manufacturer server to transmit an option code to a central server based at least on a vehicle identification number received from a client device. The method further includes decoding, at a decoding module operating at the central server, the option code to generate an option that is present on a vehicle referenced by the vehicle identification number. The decoding includes mapping, by the decoding module and based on a conversion mapping, the option code to the option accessed at an option code database in communication with the central server and the decoding module. The decoding further includes generating option data including the option. The method further includes transmitting the option data to the client device for display at the client device.

14 Claims, 8 Drawing Sheets

(56) References Cited

U.S. PATENT DOCUMENTS

| | | | | |
|---|---|---|---|---|
| 2010/0057294 | A1* | 3/2010 | Otten | G06Q 30/0603 |
| | | | | 701/33.4 |
| 2010/0332344 | A1* | 12/2010 | Mohr | G06Q 10/00 |
| | | | | 705/26.4 |
| 2011/0082804 | A1* | 4/2011 | Swinson | G06Q 30/02 |
| | | | | 705/306 |
| 2011/0313936 | A1* | 12/2011 | Sieger | G06Q 10/083 |
| | | | | 705/306 |
| 2012/0041968 | A1* | 2/2012 | Zak, Jr. | G06Q 10/10 |
| | | | | 707/769 |
| 2012/0259728 | A1* | 10/2012 | Inghelbrecht | G06Q 10/067 |
| | | | | 705/26.5 |
| 2013/0018804 | A1* | 1/2013 | Swinson | G06Q 10/10 |
| | | | | 705/306 |
| 2013/0173481 | A1* | 7/2013 | Hirtenstein | G06Q 30/0278 |
| | | | | 705/306 |
| 2013/0268298 | A1* | 10/2013 | Elkins | G06Q 40/00 |
| | | | | 705/4 |
| 2013/0332488 | A1 | 12/2013 | Christy et al. | |
| 2014/0136550 | A1* | 5/2014 | Sullivan | G06F 17/3053 |
| | | | | 707/749 |
| 2014/0379511 | A1* | 12/2014 | Heppe | G06Q 30/0639 |
| | | | | 705/26.3 |
| 2015/0242926 | A1* | 8/2015 | Taira | G06Q 30/0627 |
| | | | | 705/26.63 |
| 2016/0019615 | A1* | 1/2016 | Hart | G06Q 30/0611 |
| | | | | 705/26.4 |
| 2016/0042423 | A1* | 2/2016 | Henry | G06Q 30/0623 |
| | | | | 705/26.61 |
| 2017/0109769 | A1* | 4/2017 | Inghelbrecht | G06Q 10/067 |
| 2017/0185858 | A1* | 6/2017 | Wilbert | G06K 9/325 |
| 2017/0372381 | A1* | 12/2017 | Swinson | G06Q 30/0278 |
| 2018/0108189 | A1* | 4/2018 | Park | G07C 5/008 |
| 2018/0158086 | A1* | 6/2018 | Taira | G06Q 10/067 |

OTHER PUBLICATIONS

"Free Vin Decoder | Vehicle Information, License Plate Number, Recall Info." (2018) *Search Quarry*. Web. Accessed Jan. 10, 2019. 6 pages.

"How do you use a car's VIN number to check on its features?" *Quora*. (2014) Web. Accessed Jan. 10, 2019. 6 pages. https://www.quora.com/How-do-you-use-a-cars-VIN-number-to-check-on-its-features.

"How to Use a VIN Number to Check a Car's Options." *WikiHow*. (2018) Web. Accessed Jan. 10, 2019. 4 pages. https://www.wikihow.com/Use-a-VIN-Number-to-Check-a-Car%27s-Options.

"Vin Decoder." *North American Motoring*. (2012). Web. Accessed Jan. 10, 2019. 2 pages. https://www.northamericanmotoring.com/forums/vindecoder.php.

International Search Report and Written Opinion issued in International Application No. PCT/US2018/047792, dated Nov. 29, 2018 (Nov. 29, 2018). 6 pages.

It Still Runs. Out Packages Using VIN Number. LeafGroup. (2017) Web. Accessed Jan. 11, 2019. 12 pages.

\* cited by examiner

400

150   160   410   411

| | | 718 101 | VIN 1FTEW1EG6HFC35608 | |
| --- | --- | --- | --- | --- |
| | DE | | Suggested Retail Price | Invoice Amount |
| | | F150 4X4 PLATINUM - 145 | 57060.00 | 53066.00 |
| | | 2017 MODEL YEAR | | |
| G1 | | SHADOW BLACK | | |
| 9B | | BLACK INT W/BLACK LEATHER | | |
| | | INCLUDED ON THIS VEHICLE | | |
| | | EQUIPMENT GROUP 701A | 2540.00 | 2336.80 |
| | | PLATINUM SERIES | | |
| | | TECHNOLOGY PACKAGE | | |
| | | 360 - DEGREE CAMERA | | |
| | | ADAPTIVE CRUISE CONTROL | | |
| | | TAILGATE STEP | | |
| | | OPTIONAL EQUIPMENT/OTHER | | |
| | | . SELECTSHIFT TRANSMISSION | | |
| | | . 20" POLISHED ALUMINUM WHEELS | | |
| 99G | | 3.5L V6 ECOBOOST W / AUTO S / S | 500.00 | 460.00 |
| 44G | | ELEC 10 - SPEED AUTO W / TOW MODE | 500.00 | 460.00 |
| | | 275 / 55R20 BSW ALL-TERRAIN | | |
| XL9 | | 3.55 ELECTRONIC LOCK RR AXLE | NC | NC |
| | | 7000# GVWR PACKAGE | | |
| 153 | | FRONT LICENSE PLATE BRACKET | NC | NC |
| 422 | | CALIFORNIA EMISSIONS SYSTEM | NC | NC |
| 43V | | TWIN PANEL MOONROOF | 1295.00 | 1192.00 |
| | | PRO TRAILER BACKUP ASSIST | | |
| 53C | | MAX TRAILER TOW PACKAGE | 1295.00 | 1193.00 |
| | | .36GAL EXTENDED RANGE FUEL TAN | | |
| 55A | | FX4 OFF-ROAD PACKAGE | 770.00 | 709.00 |
| | | .SKID PLATES | | |
| | | AUTO START / STOP | | |
| 66A | | ACTIVE PARK ASSIST | 440.00 | 404.00 |
| | | TOTAL OPTIONS / OTHER | 7340.00 | 6753.00 |
| | | TOTAL VEHICLE & OPTIONS / OTHER | 64400.00 | 59819.00 |
| | | DESTINATION & DELIVERY | 1295.00 | 1295.00 |
| | | TOTAL BEFORE DISCOUNTS | 65695.00 | 61114.00 |
| | | ##SPECIAL ADDED DISCOUNTS# | | |
| | | PLATINUM LUXURY DISCOUNT | 500.00 - | 460.00 - |
| | | TECH/PARK CRUISE DISCCT | 500.00 - | 460.00 - |
| | | TOTAL SAVINGS | 1000.00 - | 920.00 - |
| | | TOTAL FOR VEHICLE | 64695.00 | |
| | | FUEL CHARGE | | 86.76 |
| | | CA NEW MTR VEHICLE BOARD FEES | | 85 |
| | | SHIPPING WEIGHT 4784 LBS . | | |
| | | TOTAL | 64695.00 | 60281.41 |

| 718101 CA 92046 | | Order Type 2 | Ramp Code RE7P | Batch ID HE041 | Price Level 755 |
| --- | --- | --- | --- | --- | --- |
| Ship to (if other than above) | | Date Inv. Prepared 05 04 17 | Item Number 71 - 5273 | Transit Days 15 | |
| | Ship Through | | | | |
| Invoice & Unit Identification No. 1FTEW1EG6HFC35608 | Final Assembly Point DEARBORN | Finance Company and/or Bank Ford Motor credit 000801 | | | |
| HB | Invoice Total | A & Z Plan | D Plan | X Plan | FPA | AA |
| 1902 | 60281.41 | 57862.41 | 57962.41 | 60314.64 | 634.00 | 951.00 |

This invoice to be used for the billing of vehicles only    Dealer's Copy

APPRAISAL SHEET

500

DEAL#_____ STOCK#_____ CUSTOMER NAME _____ DATE_____

YEAR_____ MAKE _____ MODEL _____ PACKAGE _____

MILES_____ EXTERIOR COLOR _____ INTERIOR COLOR _____

VIN# __ __ __ __ __ __ __ __ ☐ __ __ __ __ __ __ __

LICENSE PLATE #_____ EXPIRES _____ NUMBER OF PLATES 1 OR 2

EQUIPMENT (Check One)
510
- ☐ Automatic
- ☐ Air Conditioning
- ☐ Rear Air
- ☐ Power Windows
- ☐ Power Door Locks
- ☐ Tilt Wheel
- ☐ Cruise Control
- ☐ Am/FM Stereo
- ☐ Cassette
- ☐ CD (Single / Multi / MP3)
- ☐ Premium Sound
- ☐ Navigation System
- ☐ Sync
- ☐ Bluetooth Wireless
- ☐ Parking Sensors
- ☐ Backup Camera
- ☐ DVD System
- ☐ Air Bags (Front / Side / F&R)
- ☐ ABS (4 - Wheel)
- ☐ Leather
- ☐ Power Seat (Dual)
- ☐ Power Sliding Door (Dual)
- ☐ Third Row Seats
- ☐ Quad Seating
- ☐ Moon Roof
- ☐ Rear Spoiler
- ☐ Sliding Rear Window (Pwr)
- ☐ Roof Rack
- ☐ Privacy Glass
- ☐ Running Boards
- ☐ Pickup Shell/Cap
- ☐ Hard Tonneau Cover
- ☐ Bed Liner
- ☐ Custom Bumper
- ☐ Grille Guard
- ☐ Towing Package
- ☐ Dual Rear Wheel
- ☐ Alloy Wheels
- ☐ Premium Wheels (20" +)
- ☐ Misc_____

Are You the original owner?
  ☐ Yes
  ☐ No

Do You have a free and clear title? Select "No" if vehicle is leased/Financed.
  ☐ Yes
  ☐ No Does Your Vehicle have a Clean history report? (Title, mileage, accidents, etc.)
  ☐ Yes    ☐ Not Sure
  ☐ No Has anyone smoked in this vehicle or does it have any other odors?
  ☐ Yes
  ☐ No Are complete service records available?
  ☐ Yes
  ☐ No Are 2 sets of keys and remotes/alarm pads (If applicable) available?
  ☐ Yes
  ☐ No Is the CD/DVD navigation disc present? Head Phone ( Yes or No )
  ☐ Yes    ☐ Does Not Apply
  ☐ No Does this vehicle have interior defects? (Current and/or previously repaired)
  ☐ Yes    ☐ No
  _____

Does this vehicle have exterior defects? (Current and/or Previously repaired)
  ☐ Yes    ☐ No
  _____

Does this vehicle have any mechanical defects?
  ☐ Yes    ☐ No
  _____

Does this vehicle have frame damage?
  ☐ Yes
  ☐ No

Has an insurance claim ever been filed on this vehicle?
  ☐ Yes
  ☐ No

Notes: _____

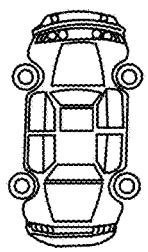

ACV _____ APPRAISER _____
  ☐ PENDING  ☐ APPROVED        ☐ FUNDER  ☐ RETAIL  ☐ WHOLESALE

FIG. 5

SYSTEMS AND METHODS OF ACCESSING AND DECODING VEHICLE MANUFACTURE INFORMATION

CROSS REFERENCE TO RELATED APPLICATIONS

The current application claims priority to under U.S.C. § 119(e) to U.S. Provisional Application No. 62/549,370 filed on Aug. 23, 2017, the contents of which are hereby fully incorporated by reference.

TECHNICAL FIELD

The subject matter described herein relates to systems, methods and computer programs for receiving and decoding information corresponding to options present on a vehicle.

BACKGROUND

Vehicles may be uniquely identified by vehicle identification numbers (VINs) that are assigned to every vehicle at the time of manufacture. In some jurisdictions, the VIN may be a 17 digit code that contains information about the manufacturer of the vehicle and the characteristics of the vehicle. The encoding format may vary between countries and depend on the year of manufacture of the vehicle.

SUMMARY

This document presents systems, methods, and techniques to access and decode vehicle information.

In one aspect, a computer implemented method is provided. The method includes generating, by a central server, a request for a manufacturer server to transmit an option code to the central server, the option code being based at least on a vehicle identification number received at the central server from a client device. The method further includes decoding, at a decoding module operating at the central server, the option code transmitted from the manufacturer server to generate an option that is present on a vehicle referenced by the vehicle identification number. The decoding includes mapping, by the decoding module and based on a conversion mapping, the option code to the option accessed at an option code database in communication with the central server and the decoding module. The decoding further includes generating, by the decoding module, option data including the option. The method further includes transmitting, by the central server to the client device, the option data to the client device for display at the client device.

In another aspect, a non-transitory computer program product storing instructions that, when executed by at least one programmable processor, cause at least one programmable processor to perform operations is provided. The operations include generating, by a central server, a request for a manufacturer server to transmit an option code to the central server, the option code being based at least on a vehicle identification number received at the central server from a client device. The operations further include decoding, at a decoding module operating at the central server, the option code transmitted from the manufacturer server to generate an option that is present on a vehicle referenced by the vehicle identification number. The decoding includes mapping, by the decoding module and based on a conversion mapping, the option code to the option accessed at an option code database in communication with the central server and the decoding module. The decoding further includes generating, by the decoding module, option data including the option. The operations further include transmitting, by the central server to the client device, the option data to the client device for display at the client device.

In another aspect a system is provided. The system includes at least one programmable processor. The system further includes a machine-readable medium storing instructions that, when executed by the at least one processor, cause the at least one programmable processor to perform operations. The operations include generating, by a central server, a request for a manufacturer server to transmit an option code to the central server, the option code being based at least on a vehicle identification number received at the central server from a client device. The operations further include decoding, at a decoding module operating at the central server, the option code transmitted from the manufacturer server to generate an option that is present on a vehicle referenced by the vehicle identification number. The decoding includes mapping, by the decoding module and based on a conversion mapping, the option code to the option accessed at an option code database in communication with the central server and the decoding module. The decoding further includes generating, by the decoding module, option data including the option. The operations further include transmitting, by the central server to the client device, the option data to the client device for display at the client device.

In some variations one or more of the following may optionally be included. The method and/or operations may further include updating, based on an update request transmitted from the central server to the manufacturer server, the conversion mapping maintained at the option code database. The method and/or operations may further include generating, by the central server, value data for the option based at least on a value listing stored at the central sever, the value listing comprising a plurality of values corresponding to a plurality of option codes comprising the option code. The method and/or operations may further include transmitting, by the central server to the client device, the value data to the client device for display at the client device. The method and/or operations may further include populating, by the central server at the client device, a base option display field. The populating may include identifying, by the central server, a base option based at least on the vehicle identification number. The populating may further include generating, by the central server, base option data based at least on the base option. The populating may further include transmitting, by the central server to the client device, the base option data for display at the base option display field.

The base option may be identified and transmitted to the client device without sending the request or the vehicle identification number to the manufacturer server. Transmitting the option data to the client device may include populating an option display field with a graphical indication identifying the option based on the option data. The method and/or operations may further include calculating, by the central server and based on the option data, a value for the vehicle referenced by the vehicle identification number. The calculating the value may include comparing the option data of the vehicle referenced by the vehicle identification number with option data of other vehicles. The calculating may further include determining, based on the comparing, whether any of the other vehicles satisfy a similarity threshold with the vehicle referenced by the vehicle identification number. The calculating may further include transmitting, to the client device, information associated with vehicles that satisfy the similarity threshold. The calculating may further include searching, based on the vehicle identification number, a third party database for the other vehicles.

Implementations of the current subject matter may include, but are not limited to, systems and methods consistent including one or more features are described as well as articles that comprise a tangibly embodied machine-readable medium operable to cause one or more machines (e.g., computers, or the like) to result in operations described herein. Similarly, computer systems are also described that may include one or more processors and one or more memories coupled to the one or more processors. A memory, which may include a computer-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a vehicle identification numbers and vehicle manufacturers, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A is an example of an invoice showing option codes, options, and price in accordance with certain aspects of the present disclosure;

FIG. 4B is an example of a sticker sheet in accordance with certain aspects of the present disclosure;

FIG. 5 is an example of an appraisal sheet 500 in accordance with certain aspects of the present disclosure;

DETAILED DESCRIPTION

Vehicle identification numbers may be used to uniquely identify a vehicle. The vehicle identification number may include information about the manufacturer of the vehicle and characteristics of the vehicle. In some implementations, the vehicle identification number may be a 17 digit alphanumeric code that is generated by the manufacturer when the vehicle is produced. It may not always be apparent, based on incomplete records or a physical inspection of the vehicle, what options or features are included with the vehicle. Based on the vehicle identification number, a manufacturer may provide option codes that correspond to the installed options. These option codes may be decoded to identify the options. The options may then be presented to a user at a client device for an accurate reporting of the options contained on the vehicle.

As used herein, "option" may refer to any of the features, modifications, components, or characteristics, of the vehicle. While options are described herein with reference to automobiles (such as cars, trucks, motorcycles, and the like), the vehicle identification number and associated options may be equally applied to any kind of object or type of vehicle. For example, boats, airplanes, trains, helicopters, personal watercraft, snow mobiles, computers, expensive property, or the like.

Also, as used herein, the term "vehicle identification number" may be any type or format of identification number. A "vehicle identification number" may include any combination of letters, numbers, and/or other characters that identify the object or vehicle in question. In some cases, this may be the 17 digit vehicle identification number commonly used for automobiles. Other vehicle identification numbers or, more generally, "identification numbers" may be equivalently used with the methods and systems described herein.

Figure 1:
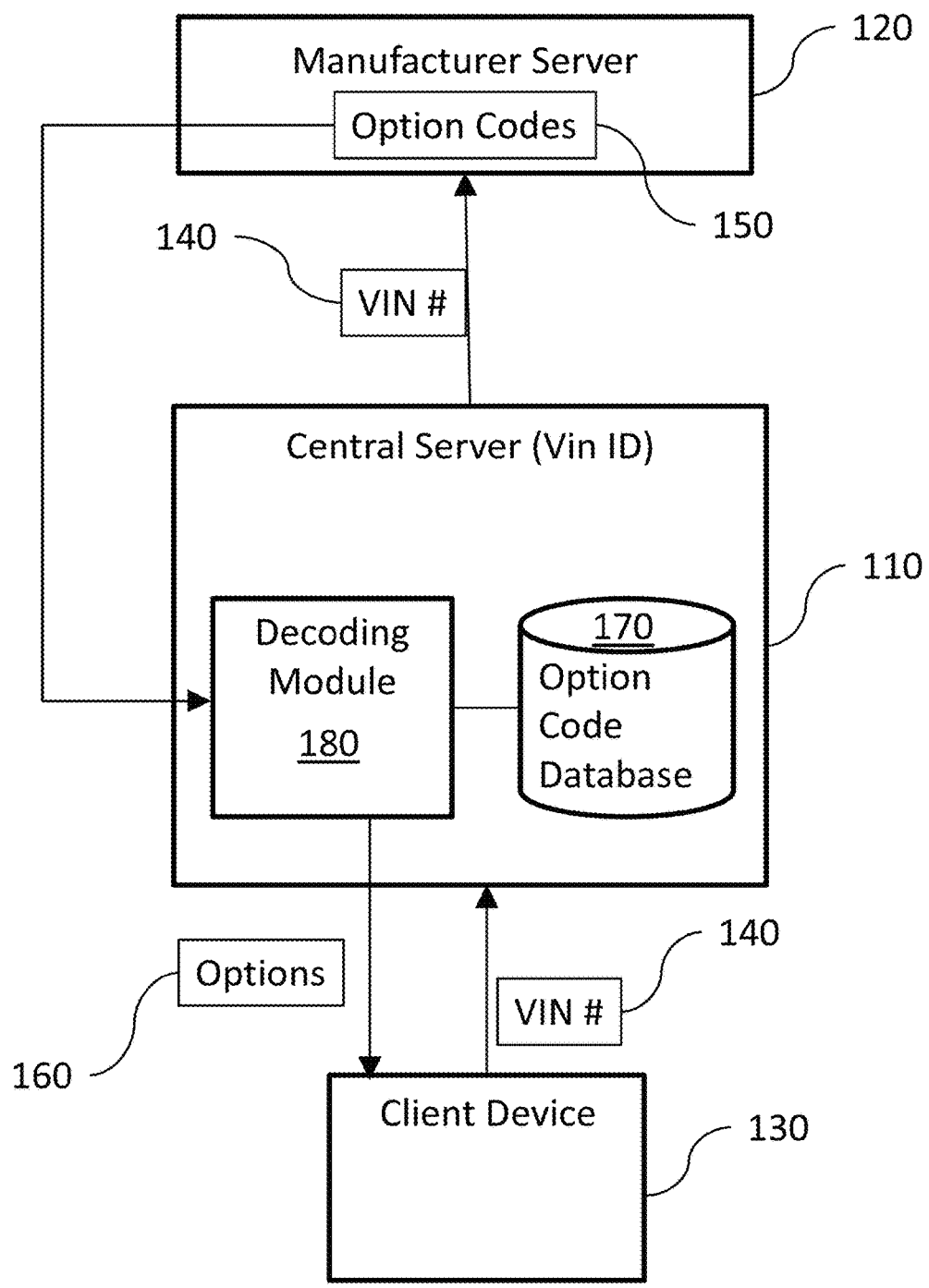
FIG. 1 is a diagram illustrating a simplified system of communication between a central server and a manufacturer server in accordance with certain aspects of the present disclosure.

FIG. 1 illustrates a simplified system of communication between a central server 110 and a manufacturer server 120 in accordance with certain aspects of the present disclosure.

In one implementation, a system may include a central server 110, a manufacturer server 120, and a client device 130. The central server 110 may be configured to receive a vehicle identification number 140 from the client device 130 and decode it based on option codes 150 received from the manufacturer server 120.

Figure 2:
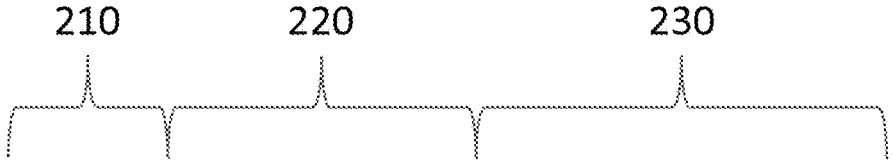
FIG. 2 is a diagram illustrating example formats of a vehicle identification number in accordance with certain aspects of the present disclosure.

FIG. 2 is a diagram illustrating example formats of a vehicle identification number 140 in accordance with certain aspects of the present disclosure. As described throughout this application, the vehicle identification number 140 may include a 17 digit alphanumeric sequence that identifies the vehicle, the manufacturer, and particular characteristics or options 160 that are included with the vehicle. FIG. 2 shows an example table of formats that are used for various vehicle identification numbers in North America and Europe. Though the exact format may vary, in all cases there are positions that correspond to the manufacturer and to the particular features of the vehicle. For example, as shown in FIG. 2, manufacturer identity positions 210 (e.g., digits 1-3), may be used to identify the manufacturer. The characteristic positions 220 (e.g., digits 4-9) may be used to identify the characteristics of the vehicle (e.g., options 160) and identification positions 230 (e.g., digits 10-17) may be used to identify a particular vehicle (e.g., model, manufacturing plant identifier, sequential number, etc.).

With the vehicle uniquely identified, the manufacturer server 120 may look up or otherwise determine what options 160 were installed on the vehicle at the time of manufacture. These options 160 have corresponding option codes 150 that may be transmitted from the manufacturer server 120 to the central server 110 for decoding and presentation on a client device 130.

Receipt of VIN from Client Device

A user of the client device 130 may desire to know what options 160 are on a vehicle (at the time of manufacture or after) based on the vehicle identification number 140. At the user interface of the client device 130, the user may enter the vehicle identification number 140 corresponding to the vehicle. In some embodiments, the user may scan a bar code, QR code, or other coded symbol to enter the vehicle identification number 140. For example, in some aspects, the user interface may comprise an application on a smart phone or other mobile device that receives a scanned reading of a QR code including the vehicle identification number 140. The application or client device 130 may then decode the QR code to read the vehicle identification number 140. In other aspects, the user may manually enter the vehicle identification number 140 into the client device 130 using the user interface.

Once the vehicle identification number 140 is entered, the client device 130 may transmit the vehicle identification number 140 to the central server 110. In some embodiments, the client device 130 comprises a transmitter and transmits the vehicle identification number 140 to the central server 110 via a communications network. The client device 130 may be a computer at a vehicle dealership which sends the vehicle identification number 140 to the central server 110 in order to receive back the option codes 150 and/or options 160 associated with the vehicle identification number 140.

Retrieving Option Codes from Manufacturer

Manufacturers may utilize option codes 150 for vehicles they manufacture. These option codes 150 may be specific to a manufacturer such that an option code 150 from one manufacturer identifying an option 160 (e.g., leather seats), may not correspond to an option code 150 from a different manufacturer identifying the same option 160 (e.g., leather seats). Accordingly, it may be beneficial for the central server 110 to retrieve option codes 150 from one or more manufacturers to ensure that the correct option codes 150 correspond to the vehicle identification number 140.

In some implementations, in response to receiving the vehicle identification number 140 from the client device 130, the central server 110 may retrieve option codes 150 corresponding to options 160 associated with the vehicle identification number 140. The central server 110 may generate a request for the manufacturer server 120 to transmit option codes 150 to the central server 110. This request may include, for example, the vehicle identification number 140 received at the central server 110 from the client device 130.

In response to the manufacturer server 120 receiving the request including the vehicle identification number 140 from the central server 110, the manufacturer server 120 may transmit back to the central server 110 the option codes 150 corresponding to options 160 that were present on the vehicle at the time of manufacture. In another embodiment, the manufacturer server 120 can be updated with information about options on the vehicle that were added after manufacture. Thus, the manufacturer server 120 can be updated to have all the additional options added to a vehicle, such that the manufacturer server 120 is continuously updated after manufacture.

The manufacturer server 120 may retrieve the option codes 150 corresponding to the vehicle identification number 140 from a database maintained at the manufacturer server 120 or from another connected computing system, for example, a remote archive or other data storage repository.

Figure 3:
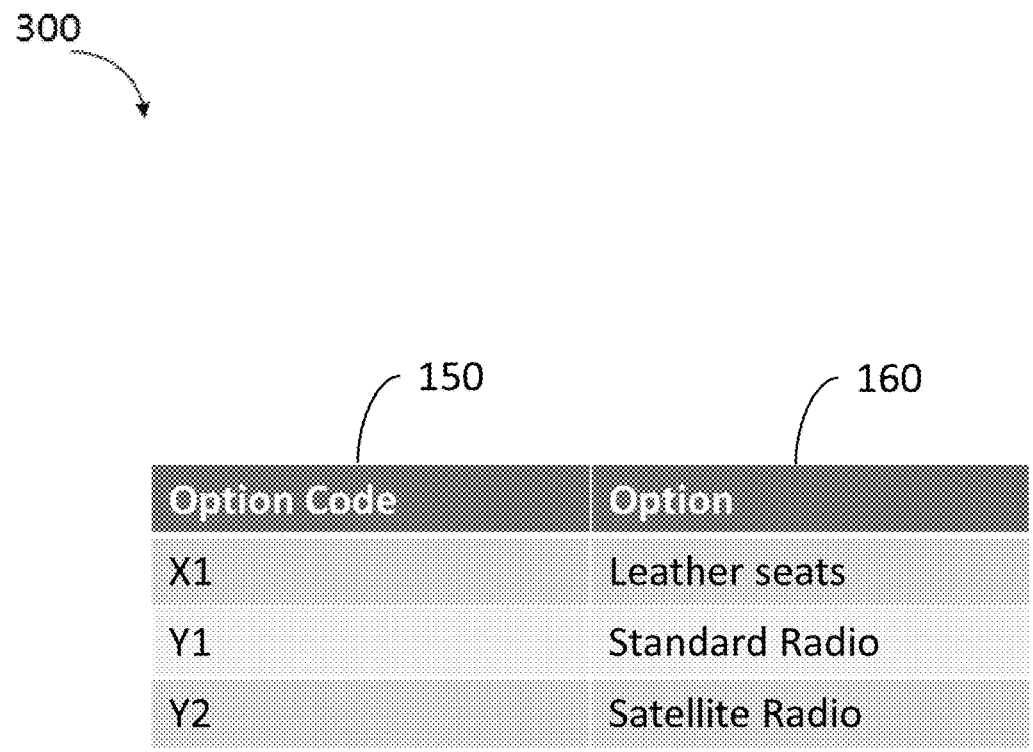
FIG. 3 is a diagram illustrating an example of a conversion mapping in accordance with certain aspects of the present disclosure.

FIG. 3 depicts a table 300 illustrating an example of mapping option codes 150 to options 160. As shown in FIG. 3, the table 300 includes an option code 150 column and an option 160 column.

In some embodiments, manufacturer server 120 may transmit the option codes 150 to the central server 110 prior to receiving a request from the central server 110. For example, the manufacturer server 120 may transmit the option codes 150 to the central server 110 at a particular interval. In some aspects the interval may be daily, weekly, monthly, bi-monthly, yearly, or any other interval. Upon receiving the option codes 150, the central server 110 may store the option codes 150 in an option code database 170 of the central server 110 or in an external database. In these aspects, the central server 110 may retrieve the option codes 150 from the appropriate database without the need to request the option codes 150 from the manufacturer server 120. For example, in response to receiving the vehicle identification number 140 from the client device 130, the central server 110 may access the option code database 170 storing option codes 150 based on the vehicle identification number 140 and retrieve the option codes 150 associated with the vehicle identification number 140.

In some embodiments, manufacturer server 120 may transmit the option 160 to the central server 110. In a non-limiting example, the manufacturer server 120 may perform some of the decoding and conversion mapping discussed below to determine which options 160 are associated with the vehicle identification number 140 received from the central server. In some aspects, the manufacturer server 120 may perform the decoding in response to a request by the central server 110 or on its own. The manufacturer server 120 may transmit the options 160 to the central server 110 at regular intervals (e.g., daily, weekly, monthly, bi-monthly, yearly, etc.). The manufacturer server 120 may also transmit the options 160 along with the vehicle identification number 140 to the central server 110 or the client device 130 for display to a user. For example, the display may include a list of options 160 include with the vehicle identification number 140.

In some embodiments, the manufacturer server 120 may transmit vehicle identification numbers 140 for all vehicles manufactured to the central server 110. The manufacturer server 120 may transmit the vehicle identification numbers 140 to the central server 110 at a particular interval. In some aspects, the interval may be daily, weekly, monthly, bi-monthly, yearly, or any other interval. The manufacturer server 120 may also send all or a portion of the vehicle identification numbers 140 to the central server 110 in response to a request by the central server 110. In response to receiving the vehicle identification numbers 140 for all vehicles manufactured, the central server 110 may store the list of vehicle identification numbers 140 in a database of the central server 110 or in an external database accessible by the central server 110. The manufacturer server 120 may also transmit the option codes 150 and/or the options 160 associated with each of the vehicle identification numbers 140 for all vehicles manufactured.

The central server 110 may identify a manufacturer of the vehicle based on the received vehicle identification number 140 and may transmit a request to the database or the manufacturer server 120 based on the identified manufacturer. For example, the vehicle identification number 140 may include an indication of the manufacturer of the vehicle that is decoded by the central server 110. The identity of the manufacturer may be transmitted by the client device 130 along with the vehicle identification number 140. The identification of the manufacturer may aid in allowing the central server 110 to request option codes 150 from a corresponding manufacturer server 120 or retrieve option codes 150 from the correct database.

Decoding of Option Codes

As shown in FIG. 1, the central server 110 may include a decoding module 180. The decoding module 180 may be configured to decode the option codes 150 transmitted from the manufacturer server 120. The decoding module 180 may be, for example, the computer program configured to be executed at the central server 110 or other computing system. The decoding module 180 may execute the program automatically upon receipt of the option codes 150 or may run the program in a standby mode and decode the option codes 150 at a later time. In other implementations, the decoding module 180 may wait until a complete set of option codes 150 has been received before decoding the option codes 150. Once decoded, the central server 110 may generate an option 160 that is present on the vehicle referenced by the vehicle identification number 140.

The decoding may include mapping an option code 150 to an option 160 based on a conversion mapping. The conversion mapping may be, for example, a table (as shown in FIG. 3), a key, or other data structure that identifies an option 160 based on an option code 150.

The conversion mapping may include entries corresponding to option codes 150 provided by a manufacturer and their associated translated version. In the example of FIG. 3, if the manufacturer server 120 returned an option code 150 of "X1," then the conversion mapping may be used by the decoder module 180 to identify that the option code "X1" corresponds to "Leather seats." Option data identifying the option 160 as leather seats may then be transmitted to the client device 130 for display on the graphical user interface. The option codes 150 and options 160 shown in FIG. 3 are intended as examples only and should not be considered limiting or exclusive. The particular option code 150 and the options 160 that they correspond to may be determined by the manufacturer and may be modified and/or updated at both the manufacturer server 120 and the central server 110.

The conversion mapping and a list of options 160 corresponding to the conversion mapping may be accessed at an option code database 170 in communication with the central server 110 and the decoding module 180. The option code database 170 may be located at the central server 110, or alternatively at the manufacturer server 120, or alternatively elsewhere. In other implementations, the option code database 170 may be located at an external system in a wired or wireless communication with the central server 110 and/or the decoding module 180.

The central server 110 may transmit an update request to the manufacturer server 120 for the manufacturer server 120 to transmit an updated conversion mapping to the central server 110. The conversion mapping may, for example, be updated in response to reorganization or reassignment at the manufacturer server 120 of option codes 150. The update request may be transmitted at a particular interval, for example, daily, weekly, monthly, or any other interval. Optionally, the update request may be transmitted automatically or manually prior to a request for the option codes 150. The update request may also be transmitted upon receipt of one or more vehicle identification numbers 140 from the client device 130. The update request may also be transmitted upon receipt of option codes 150 and before the options 160 corresponding to the option codes 150 are determined and transmitted to the client device 130. This may ensure that the option code database 170 is up-to-date when the central server 110 receives the options codes 150 from the manufacturer server 120. In yet other implementations, the updated conversion mapping may be generated based on new data received from the manufacturer server 120 and transmitted to the central server 110 without an explicit request sent by the central server 110. The central server 110 may store the updated conversion mapping of option codes 150 in the option code database 170 or another database internal or external to the central server 110.

When the central server 110 retrieves the options 150, the decoding module 180 may generate option data comprising the option 160. Option data may include, for example electronic data that may be transmitted to the client device 130 for display. The option data may be, for example, a list, table, or other data structure that may be interpreted by the client device 130 and displayed to the user on a user interface. The option data may include an invoice listing the option codes 150, the options 160, and/or a cost associated with each option 160. FIG. 4A is an example of an invoice 400. As shown in FIG. 4A, the invoice includes an option code 150 column, an option 160 column, a suggested retail price column 410, and an invoice amount column 411. The columns 410 and 411 show the different cost associated with the different options 160 and corresponding option codes 150.

In other aspects, the data structure may include a sticker sheet (e.g., a Monroney sticker) used by a dealer or wholesaler of a vehicle which lists the vehicle description and any included options 160. Sticker sheets may be attached to a vehicle to allow a potential buyer to easily view the available and included options 160 for a given vehicle.

Figure 4B:
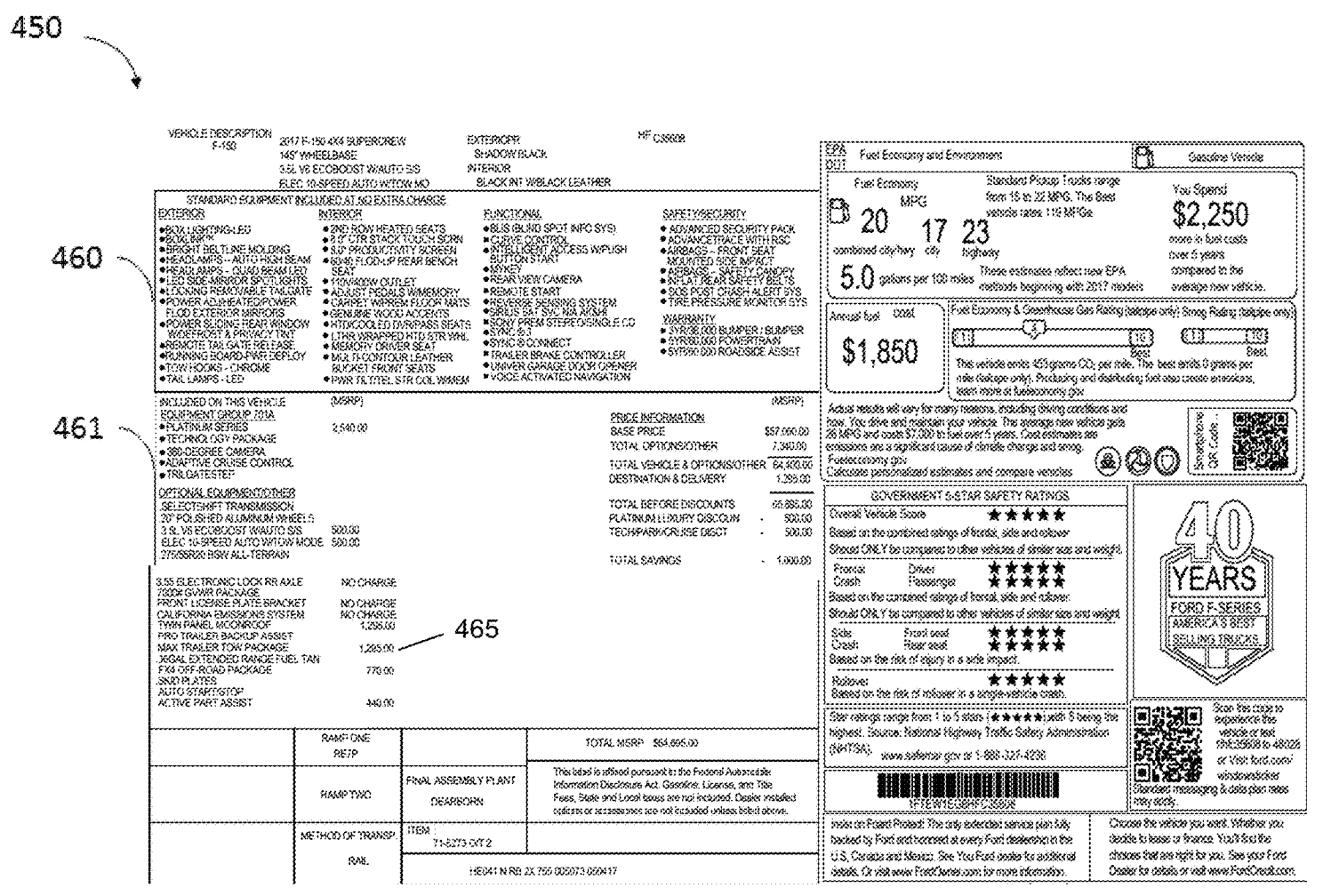

FIG. 4B is an example of a sticker sheet 450 in accordance with some example embodiments. As shown in FIG. 4B, the sticker sheet 450 includes base options 460 and premium options 461. Base options 460 may include options (e.g., options 160) that come standard for all vehicles of a particular make and/or model. The base options 460 may be included in the price of the vehicle such as headlamps, rear-view camera, remote start, airbags, and/or the like. The premium options 461 may include options (e.g., options 160) that are optional and may require an extra cost (e.g., price 465 in FIG. 4B) to include as part of the vehicle. Examples of premium options 461 may include leather seats, sun roof, moon roof, convertible roof, premium wheels, larger engine, park assist, premium stereo, alarms, remote entry, and/or the like.

In some implementations, the central server 110 may return base options (e.g., base options 460) to the client device 130 without having to access the option code database 170 or generating a request for option codes 150 from the manufacturer. For example, the vehicle identification number 140 may include an identifier of a particular make, model, and year of production of an automobile. With this information, the base options that are common to all such vehicles may be quickly determined by the central server 110. For instance, the central server 110 may identify a base option based at least on the vehicle identification number 140. In some aspects, the central server 110 may be preprogrammed with the base options for each of one or more known manufacturers of vehicles. In other aspects, the central server 110 may retrieve the base options from the manufacturer server 120 of the one or more known manufacturers or from a third-party server or database.

Once the central server 110 identifies the base options, the central server 110 may generate base option data based at least on the identified base option associated with the vehicle identification number 140. The central server 110 may then transmit, to the client device 130 (or any desired computing system or memory store) the base option data for display at the client device 130. In general, any of the functionality described herein with regard to determining and displaying options 160 may be implemented for base options 460 and premium options 461 (e.g., looking up the value of a base option in a manner similar to looking up the value of an option 160 determined from the option codes 150 received by the manufacturer server 120).

Determining Value of an Option

The central server 110 may also generate value data for the option 160, base option 460, and/or premium option 461 based at least on a value listing stored at the central server 110. The value data may be similar to the option data, for example, a list, table, or other data structure that may be interpreted by the client device 130 and displayed to the user. The value listing may be, for example, a table, list, or the like, of dollar or cost values that correspond to the option codes 150 maintained at the option code database 170. For example, the option 160 of "Leather seats" may have a value of "$1,000" and that value data (e.g., cost 465) may be returned to the client device 130 along with the name or other identifier of the option 160. In some implementations, the client device 130 may automatically update a total value of the vehicle based on the received value data that corresponds to the options 160 identified by the vehicle identification number 140.

In some aspects, the value data may be based on the intended seller or purchaser of the vehicle. For example, the option 160 of "Leather seats" may have a value of "$1,000" for a dealership selling a new car retail but a value of "$800" for an owner selling their used car on a third party site. Accordingly, the central server 110 may return value data for each option 160 included in the vehicle identification number 140. The value data for each option 160 may include an invoice cost of the option 160, a manufacturer MSRP for the option 160, third-party sales of cars bearing the option 160, or any other determination of the value of the option 160. In some aspects, in order to determine the value of the option 160 based on third-party sales, the central server 110 may retrieve third-party sales data from one or more third party sources (e.g., third party server 525, described below). For example, the central server 110 may retrieve sales data from the DMV, dealerships, auction houses, or other websites or entities that store used vehicle sales. The different values for the option 160 may beneficially allow a user at the client device 130 to determine which value should apply to the user's scenario.

Displaying an Option List at Client Device

In some embodiments client device 130 may execute a program or application that may display the options 160 received from the central server 110 and associated with the vehicle identification number 140, and optionally the values of the options 160, to a user through a graphical interface. In some implementations, the graphical user interface may include an option display field that may be populated with a graphical indication identifying the option 160 based on the option data received from the central server 110. The option display field may be for example, a text window, region of the graphical interface, field in a form, entries in a table, a sticker sheet, or the like. The graphical user interface may also include base option display fields that may display base option data received from the central server 110. The base options 160 may be automatically populated in the base option display field upon receipt of the base option data. Similarly, the value of any of the options 160 may be displayed at a corresponding value display field, which may or may not include the option display field used to display the option 160.

Determining a Sales Price of a Vehicle

Determining a sales price of a used vehicle may be difficult under conventional systems. Often, an owner may take their vehicle to a dealership to determine a trade-in or cash value of their car. Sometimes, the owner may choose to sell their vehicle themselves and wish to determine an accurate estimate for the current value of their vehicle.

At a dealership setting, an employee of the dealership may inspect a vehicle and note the condition, miles, and options 160 visible to the employee. Many times the employee manually writes or notes the options 160 on an appraisal sheet or other inspection sheet. FIG. 5 is an example of an appraisal sheet 500 in accordance with certain aspects of the present disclosure. Such appraisal sheets do not follow a standard format from dealership to dealership, let alone from manufacturer to manufacturer. These differences may lead to inaccuracies from both the structure of the appraisal sheet and/or human error when noting the options 160 associated with the vehicle. Such errors are common because of the large number of unique combinations of options 160 (up to at least 50) for any given vehicle. For example, the appraisal sheet may not note all of the options 160 included in the vehicle, as shown in section 510 of the appraisal sheet 500. Additionally, the employee may not note all the options 160 (e.g., not check all the applicable boxes of section 510) or may erroneously include options 160 that are not present on the vehicle (e.g., check incorrect boxes in section 510).

Additionally, once the employee notes on the appraisal sheet all the options 160 he or she observed, the employee must then enter that information into a computer or other user interface to calculate the value of the vehicle. This additional level of manual entry may lead to further inaccuracies associated with data entry (e.g., typos, lost data, system failures, etc.). For additional transfers of ownership of the vehicle (e.g., sales at auction, repossessions, wholesale sales, retail sales, etc.), this process is repeated, leading to an increased likelihood of additional inaccuracies. Such errors may cost a dealership up to 6% of profits or more, and the impact extends throughout the industry, affecting manufacturers, lending banks, auctioneers, insurance companies, car owners, and/or the like.

For example, a bank may finance the purchase of a vehicle based on the valuation of the dealership employee. If the borrower/purchaser defaults on the payments of the loan, the bank may repossess the vehicle. After repossession, the bank agent or employee may discover that the vehicle does not include one or more options 160 that was previously noted and thus is valued less than originally determined. The bank may then charge the dealership for the difference in value because the dealer stated the incorrect information during valuation.

In a for-sale-by-owner situation, an owner may research the value of their car through a number of resources. The owner may search online for different websites that offer estimates of their car's value. For example, websites such as www.kbb.com or www.truecar.com may provide an owner with a value of their vehicle. However, these websites require the user to manually enter all the options 160 that may affect the value of their vehicle. For example, the user may be required to enter the engine type, trim, wheel size, sport features, sunroof, special packages, or the like. Often times this information is not readily available for the user to enter and the user may input values based on memory or best guess. As discussed above, such entries are rife with human error due to inaccurate memory, data entry error, or the like.

The above inaccuracies may lead to an inaccurate estimate of the value of the vehicle. For example, the owner may fail to note all the options 160 included in the vehicle and may generate a sales price or trade-in value that is below the actual value of the vehicle. Likewise, the owner may include options 160 that are not actually included in the vehicle and generate a sales price or trade-in value that is above the actual value of the price. These situations may result in an owner not receiving adequate value for his or her vehicle, the owner not believing he or she is being fairly compensated for the vehicle when in fact they are (likely causing the dealer to lose a sale), or may result in the dealer paying too much for a vehicle and being unable to make a profit when selling the vehicle.

Embodiments described herein may result in improved accuracy and efficiency when determining a current value of a vehicle, which may also aid in determining an appropriate sales price.

Figure 6:
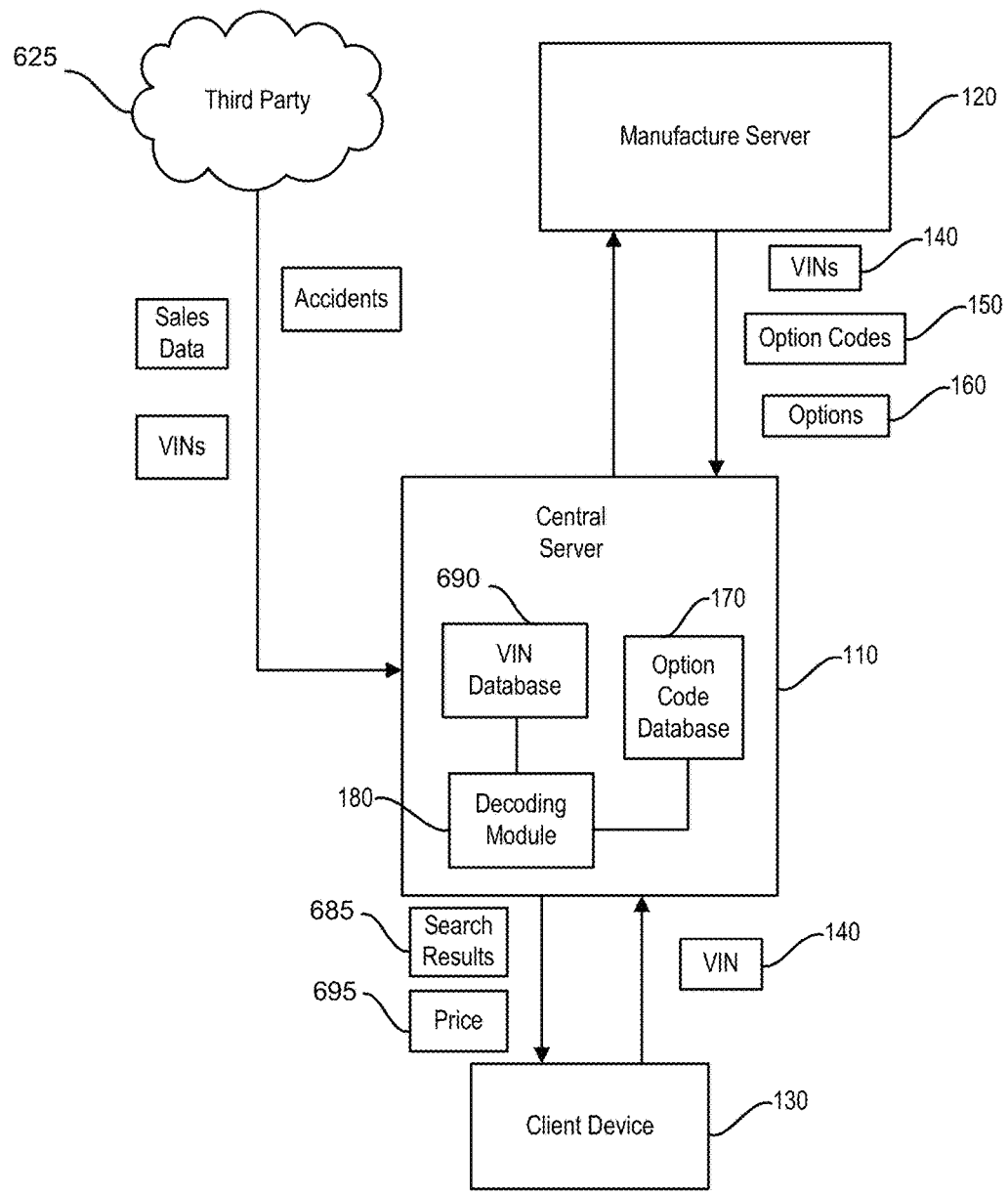
FIG. 6 is a diagram illustrating a simplified system of communication between a central server and a manufacturer server in accordance with certain aspects of the present disclosure.

FIG. 6 of is a diagram illustrating a simplified system of communication between the central server 110, a third party server 625, the client device 130, and the manufacturer server 120 in accordance with certain aspects of the present disclosure. FIG. 6 is similar to and adapted from the system of communication of FIG. 1 and the only differences between the two are discussed for the sake of brevity.

In some embodiments, a process for determining a value of a used vehicle may begin with the entry of the vehicle identification number 140 at a client device 130. As discussed above, the entry may be manual or automatic through the use of a scanned code.

The automatic entry of the vehicle identification number 140 by scanning a bar code, QR code, or other coding system may be beneficial to prevent errors from manual entry. Additionally, since the option codes 150 and/or options 160 are automatically returned based on the entered vehicle identification number 140, occurrences of errors from manual inspection and from entry of options associated with the vehicle may be reduced or eliminated.

Next, the central server 110 may retrieve the vehicle identification number 140 from the client device 130. The central server 110 may then perform a reverse search on the vehicle identification number 140 to determine the other vehicles with identical options 160 to the entered vehicle identification number 140 that are for sale or recently sold. A user may enter the vehicle identification number 140 which includes option codes 150 corresponding to options 160 for the entered vehicle. For example, the entered vehicle identification number 140 may correspond to a 2017 Ford F-150 with options 160 of Shadow Black exterior paint, black leather seats, second row heated seats, and a rear-view camera. The central server 110 may then search a database using option codes 150 corresponding to the options 160 described above to find other 2017 Ford F-150s with the identical options 160, check the sales information on such other vehicles, and return that information.

As shown in FIG. 6, the central server 110 may include a VIN database 690 of vehicle identification numbers 140 of all vehicles manufactured by a particular manufacturer. The VIN database 690 may be connected to the decoding module 180 and/or the option code database 170. The central server 110 may also request from the manufacturer server 120 the vehicle identification numbers 140 of vehicles having identical or similar option codes 150 and/or options 160 of the entered vehicle. In some aspects, one or more of the central server 110, the manufacturer server 120, and an external server may perform decoding and/or conversion mapping to determine which option codes 150 and/or options 160 are associated with each vehicle from the list of vehicle identification numbers 140 in the database. The central server 110 may then search which vehicles have identical or similar option codes 150 and/or options 160 of the entered vehicle. After comparing the option codes 150 and/or options 160 a searched vehicle to the entered vehicle, the central server 110 may include the searched vehicle in the search results 685 if the searched vehicle satisfies a similarity threshold with the entered vehicle. The similarity threshold may be based on a type or number of option codes 150 and/or options 160 that match the entered vehicle.

Based on the number of search results returned for vehicles with identical options 160, the central server 110 may also search for vehicles with similar options. For example, if the search does not return any 2017 Ford F-150s with identical options 160, the central server 110 may search for any 2017 Ford F-150s with the same options 160, except for the exterior paint color or any other specified option 160. In some implementations, the central server 110 may determine which option 160 to remove from the search based on a price of the option 160, a user preference for the option, an availability of the option 160, or any other criteria.

For example, the central server 110 may first remove the option 160 that has the lowest value. If a minimum number of search results are not achieved, the central server 110 may remove the option 160 with the next lowest value. The process may be repeated until the minimum number of search results is achieved. In other aspects, the central server 110 may first remove the option 160 indicated by a user at the client device 130. The central server 110 may also first remove the option 160 that most affects the number of search results returned. At each step of removing an option 160, the central server may update the value(s) of the vehicles returned. The value of the options 160 described above may be based on an invoice cost, MSRP, third-party sales, or any other valuation of an individual or group of options 160. Any of the above criteria used for achieving the desired number of search results may be used individually or in combination. As shown in FIG. 6, the central server 110 may return search results 685 to a user of the client device 130. The displayed search results 685 may allow the user to further filter the search results 685 or view information associated with the vehicles of the search results (e.g., price 695 and options 160).

Some options 160 associated with the vehicle identification number 140 may not have a cost associated with them (e.g., base options 460) and would not affect the price of the vehicle. Such no-cost options may be ignored during a search for identical or similar vehicles. In some embodiments, if no matches are found, the system will start eliminating options 160 starting with the lowest costing options first until a minimum amount of vehicles are found of similar configuration to the vehicle identification number 140. If a minimum number of vehicles are not found from sales listings or recent sales, then the central server 110 may determine a price of the vehicle based on a manufacturer's suggested retail price (MSRP) of a new vehicle and a lease residual value model, annual depreciation, or some other algorithm for calculating vehicle depreciation.

If the central server 110 retrieves the minimum number of identical or similar vehicles, then it may determine a value of the vehicle based on the sales price of the identical or similar vehicles. For example, the central server 110 may search databases storing used car sales data to find what price the vehicles sold for, where they sold, how recently they sold, etc. In some embodiments, the searched databases may be located on a third party server 625 and may comprise one or more databases of the Department of Motor Vehicles (DMV), dealerships, auction houses, or other entities that store used vehicle sales. In some aspects, such used car sales data may be retrieved by the central server 110 and stored in a database connected internally or externally to the central server 110.

The central server 110 may generate an estimated value of the vehicle associated with the entered vehicle identification number 140 based on the search results 685 of other identical or similar vehicles. The central server 110 may also generate the estimated value based on other inputs by the user. For example, the user may input a mileage, condition, location, etc. of the vehicle and the central server 110 may base its estimated value on the user inputs. Additionally, the user may input any additional features added or removed from the vehicle after the original sale (upgraded rims, custom paint, upgraded speakers, etc.). In some aspects, the central server 110 may apply a weighted factor in determining the estimated value. For example, the central server 110 may apply a higher weight factor to vehicle sales within the same ZIP code or with similar mileage than to vehicles further away or with dissimilar mileage.

The generated estimated value may include one or more prices based on a certain scenario, the intended seller, or the intended buyer. For example, the central server 110 may generate one or more of an estimated wholesale sales price, dealer purchase price, dealer sales price, third-party sales price, owner trade-in value, etc. The different generated estimated values for the vehicle, may beneficially allow a user at the client device 130 to determine which value should apply to the user's scenario.

In some embodiments, the user may wish to filter the search results 685 of similar vehicles based on certain factors. For example, the user may want to filter out vehicles that have been in accidents or may only want to include certified pre-owned vehicles. Additionally, the central server 110 may search accidents reports and return one or more accidents associated with the vehicle identification number 140. The user may then filter for vehicles with identical or similar accidents. The central server 110 may receive these user filters and determine its estimated value based on the filters applied. In some aspects, the central server 110 may receive accident or certified pre-owned data from the third party server 525.

For example, the central server 110 determine an estimated value of $60,000 for the vehicle based on all 2017 F-150s with identical options 160 to the options 160 associated with the vehicle identification number 140. If a user filters the results to include only certified pre-owned vehicles, the central server 110 may determine that an estimated value of $65,000 based on the certified pre-owned 2017 F-150s with identical options 160 to the options 160 associated with the vehicle identification number 140.

The central server 110 may determine the estimated value of the vehicle associated with the vehicle identification number 140 and communicate the estimated value (e.g., price 695) to the user. In some aspects, the central server 110 transmits the estimated value to the client device 130 to display to the user. Additionally, the central server 110 may also, or instead, return a suggested retail price, trade-in value, dealer price, or any other pertinent value for the vehicle.

The format and output of the estimated value or other pertinent values of the vehicle may be displayed to the user in a variety of configurations. In some aspects, the user may customize the format of the estimated value. In other aspects, the format and output may be standardized for certain users and applications (e.g., dealerships under common ownership). For example, in some embodiments the output of the estimated value may include a breakdown of each option 160 of the vehicle and the associated value of the option 160. The output of the estimated value may also include a suggested trade-in value and the most recent trade-in value for a vehicle with identical or similar options 160.

Figure 7:
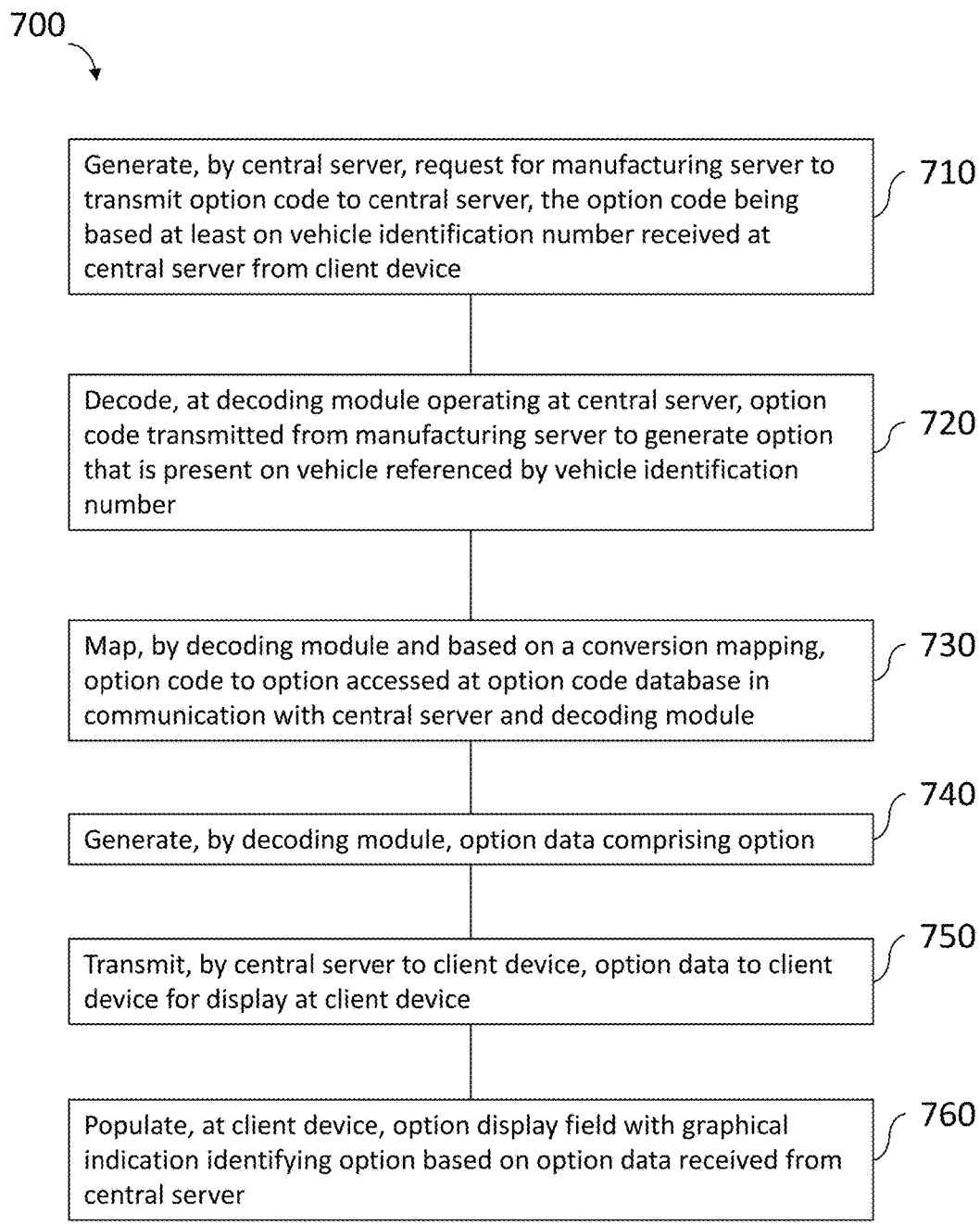
FIG. 7 is a diagram illustrating a method for determining and displaying options at a client device in accordance with certain aspects of the present disclosure.

FIG. 7 is a diagram illustrating a method 700 for determining and displaying options 160 at a client device 130 in accordance with certain aspects of the present disclosure. In some aspects, one or more of the steps described in the method of FIG. 7 may be performed by the central server 110, the manufacturer server 120, or any other similar device.

At block 710 the method includes generating, by the central server 110, a request for the manufacturer server 120 to transmit option codes 150 to the central server 110, with the option codes 150 being based on the vehicle identification number 140 received at the central server 110 from the client device 130. At block 720, the method includes decoding, by the decoding module 180, option codes 150 transmitted from the manufacturer server 120 to generate an option 160 that is present on the vehicle associated with the vehicle identification number 140.

At block 730 the method further includes mapping, by the decoding module 180 and based on a conversion mapping, option codes 150 to options 160 accessed at the option code database 170 in communication with the central server 110 and the decoding module 170. At block 740, the method includes generating, by the decoding module 180, option data comprising the option 160. At block 750, the method further includes transmitting, by the central server 110, option data to the client device 130 for display at the client 130. At block 760, the method includes populating, at the client device 130, an option display field with a graphical indication identifying the option 160 based on the option data received from the central server 110.

Although a few embodiments have been described in detail above, other modifications are possible. For example, the components described in the figures may be located or implemented in other systems besides those shown. For example, the option code database 170 need not be physically located at the central server 110. Similarly, the decoder need not be executed at the central server 110. Also, for example, the method steps depicted in the figures and described herein do not require the particular order shown, or sequential order, to achieve desirable results.

Because of the high-level nature and complexity of the selections and methods described herein, including the multiple and varied combinations of different calculations, computations and selections, such selections and methods cannot be done in real time quickly, or at all, by a human. The processes described herein rely on the machines described herein.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to programs, software, software applications, applications, components, or code, include machine instructions for a programmable processor, and may be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. The implementations described above may be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Specifically, and by way of example, although the headings refer to a "Technical Field," such claims should not be limited by the language chosen under this heading to describe the so-called technical field. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system comprising:
   at least one programmable processor; and
   a non-transient machine-readable medium storing instructions which, when executed by the at least one programmable processor, causes the at least one programmable processor to perform operations comprising:
      generating, by a central server, a request for a manufacturer server to transmit an option code to the central server, the option code being based at least on a vehicle identification number received at the central server from a client device;
      decoding, at a decoding module operating at the central server, the option code transmitted from the manufacturer server to generate an option that is present on a vehicle referenced by the vehicle identification number, the decoding comprising:
         mapping, by the decoding module and based on a conversion mapping, the option code to the option accessed at an option code database in communication with the central server and the decoding module; and
         generating, by the decoding module, option data comprising the option;
      transmitting, by the central server to the client device, the option data to the client device for display at the client device;
      comparing, by the central server, the option data of the vehicle referenced by the vehicle identification number with option data of other vehicles in a vehicle sales database, the vehicle sales database comprising option data and value data for the other vehicles, wherein the comparing comprises a reverse search of the vehicle sales database for vehicles with the same option codes;
      determining, by the central server, based on the comparing, whether any of the other vehicles satisfy a similarity threshold with the vehicle referenced by the vehicle identification number, wherein the similarity threshold is based on a number of options from the other vehicles that match generated options of the vehicle referenced by the vehicle identification number, the generated options generated by the decoding module in response to decoding option codes encoded into the vehicle identification number;
      transmitting, by the central server, to the client device, option data and value data associated with vehicles that satisfy the similarity threshold, wherein the similarity threshold is based on a type or number of option codes of the other vehicles that match option codes of the vehicle referenced by the vehicle identification number;
      populating, at a user interface of the client device, an option display field with a graphical indication identifying the option based on the option data received from the central server and a value display field, the value display field indicating an associated value of the option based on the option data; and
      calculating a value for the vehicle referenced by the vehicle identification number based on the transmitted option data and the transmitted value data for the other vehicles that satisfy the similarity threshold.

2. The system of claim 1, the operations further comprising:
   updating, by the manufacturing server, based on an update request transmitted from the central server to the manufacturer server, the conversion mapping maintained at the option code database.

3. The system of claim 1, the operations further comprising:
   generating, by the central server, value data for the option based at least on a value listing stored at the central sever, the value listing comprising a plurality of values corresponding to a plurality of option codes comprising the option code;
   transmitting, by the central server to the client device, the value data to the client device for display at the client device.

4. The system of claim 1, the operations further comprising:
   populating, at the client device, a base option display field, the populating comprising:
      identifying, by the central server, a base option based at least on the vehicle identification number;
      generating, by the central server, base option data based at least on the base option; and
      transmitting, by the central server to the client device, the base option data for display at the base option display field.

5. The system of claim 4, wherein the base option is identified and transmitted to the client device without sending the request or the vehicle identification number to the manufacturer server.

6. The system of claim 1, wherein the transmitting the option data to the client device comprises populating an option display field with a graphical indication identifying the option based on the option data.

7. The system of claim 1, the decoding further comprising:
   determining, by the decoding module, that a complete set of option codes has been received, wherein the mapping is in response to the determining.

8. A computer-implemented method comprising:
   generating, by a central server, a request for a manufacturer server to transmit an option code to the central server, the option code being based at least on a vehicle identification number received at the central server from a client device;
   decoding, at a decoding module operating at the central server, the option code transmitted from the manufacturer server to generate an option that is present on a vehicle referenced by the vehicle identification number, the decoding comprising:
      mapping, by the decoding module and based on a conversion mapping, the option code to the option accessed at an option code database in communication with the central server and the decoding module; and
      generating, by the decoding module, option data comprising the option;
   transmitting, by the central server to the client device, the option data to the client device for display at the client device;
   comparing, by the central server, the option data of the vehicle referenced by the vehicle identification number with option data of other vehicles in a vehicle sales database, the vehicle sales database comprising option data and value data for the other vehicles, wherein the comparing comprises a reverse search of the vehicle sales database for vehicles with the same option codes;

determining, by the central server, based on the comparing, whether any of the other vehicles satisfy a similarity threshold with the vehicle referenced by the vehicle identification number, wherein the similarity threshold is based on a type or number of option codes of the other vehicles that match the option codes of the vehicle referenced by the vehicle identification number, wherein the similarity threshold is based on a number of options from the other vehicles that match generated options of the vehicle referenced by the vehicle identification number, the generated options generated by the decoding module in response to decoding option codes encoded into the vehicle identification number;

transmitting, by the central server, to the client device, option data and value data associated with vehicles that satisfy the similarity threshold;

populating, at a user interface of the client device, an option display field with a graphical indication identifying the option based on the option data received from the central server and a value display field, the value display field indicating an associated value of the option based on the option data; and calculating a value for the vehicle referenced by the vehicle identification number based on the transmitted option data and the transmitted value data for the other vehicles that satisfy the similarity threshold.

9. The method of claim 8, further comprising:

updating, by the manufacturing server, based on an update request transmitted from the central server to the manufacturer server, the conversion mapping maintained at the option code database.

10. The method of claim 8, further comprising:

generating, by the central server, value data for the option based at least on a value listing stored at the central sever, the value listing comprising a plurality of values corresponding to a plurality of option codes comprising the option code;

transmitting, by the central server to the client device, the value data to the client device for display at the client device.

11. The method of claim 8, further comprising:

populating, by the central server at the client device, a base option display field, the populating comprising:
  identifying, by the central server, a base option based at least on the vehicle identification number;
  generating, by the central server, base option data based at least on the base option; and
  transmitting, by the central server to the client device, the base option data for display at the base option display field.

12. The method of claim 11, wherein the base option is identified and transmitted to the client device without sending the request or the vehicle identification number to the manufacturer server.

13. The method of claim 8, wherein the transmitting the option data to the client device comprises populating an option display field with a graphical indication identifying the option based on the option data.

14. A non-transitory computer program product storing instructions that, when executed by at least one programmable processor, cause at least one programmable processor to perform operations comprising:

generating, by a central server, a request for a manufacturer server to transmit an option code to the central server, the option code being based at least on a vehicle identification number received at the central server from a client device;

decoding, at a decoding module operating at the central server, the option code transmitted from the manufacturer server to generate an option that is present on a vehicle referenced by the vehicle identification number, the decoding comprising:
  mapping, by the decoding module and based on a conversion mapping, the option code to the option accessed at an option code database in communication with the central server and the decoding module; and
  generating, by the decoding module, option data comprising the option;

transmitting, by the central server to the client device, the option data to the client device for display at the client device;

comparing, by the central server, the option data of the vehicle referenced by the vehicle identification number with option data of other vehicles in a vehicle sales database, the vehicle sales database comprising option data and value data for the other vehicles, wherein the comparing comprises a reverse search of the vehicle sales database for vehicles with the same option codes;

determining, by the central server, based on the comparing, whether any of the other vehicles satisfy a similarity threshold with the vehicle referenced by the vehicle identification number, wherein the similarity threshold is based on a type or number of option codes of the other vehicles that match the option codes of the vehicle referenced by the vehicle identification number, wherein the similarity threshold is based on a number of options from the other vehicles that match generated options of the vehicle referenced by the vehicle identification number, the generated options generated by the decoding module in response to decoding option codes encoded into the vehicle identification number;

transmitting, by the central server, to the client device, option data and value data associated with vehicles that satisfy the similarity threshold;

populating, at a user interface of the client device, an option display field with a graphical indication identifying the option based on the option data received from the central server and a value display field, the value display field indicating an associated value of the option based on the option data; and calculating a value for the vehicle referenced by the vehicle identification number based on the transmitted option data and the transmitted value data for the other vehicles that satisfy the similarity threshold.

* * * * *